United States Patent Office 3,299,707
Patented Jan. 24, 1967

---

3,299,707
METHOD OF MEASURING TEMPERATURES
Yvon-Pol Noel, Pery, Trooz, Belgium, assignor to Centre National de Recherches Metallurgiques, Liege, Belgium
Filed May 25, 1964, Ser. No. 369,787
Claims priority, application Belgium, May 31, 1963, 633,157
1 Claim. (Cl. 73—339)

This invention relates to the method of measuring temperature in which sound waves are passed through an elongated guide exposed to the material whose temperature is to be measured and the velocity of the waves is determined and used as an indication of the average temperature of the material.

The invention is especially applicable to the measuring of temperatures of gases in furnaces. The use of a guide has an advantage over other methods of measuring temperatures by the propagation of sound waves through the actual material whose temperature is to be measured is that, since a guide is used variations in the chemical nature of the material and, in the case of the gas, pressure fluctuations do not have any influence on the velocity of the sound waves.

Preferably in accordance with the invention, a directional sound emitter, for instance an ultrasonic one, is placed outside the enclosure containing the material and the receiving part of the apparatus is also placed outside the enclosure. The use of a directional emitter facilitates the detection of the sound waves at the other end of the guide and makes the determination of their speed of propagation, for instance by using a phase shift method, more exact. By placing the sound emitter and receiver outside the enclosure they are protected from the heat.

If the material whose temperature is to be measured is corrosive, for instance a furnace gas, or contains much dust it may be advantageous to cause the guide to vibrate by using a mechanical or electromagnetic device so as to shake off the dust or products of corrosion. This vibration is best carried out at various frequencies in order to vary the positions of the nodal points and corresponding deposits of dust or corrosion products are not left, on corresponding positions. The vibration has the additional advantage of facilitating the transmission of heat to and from the guide.

Figure 1:
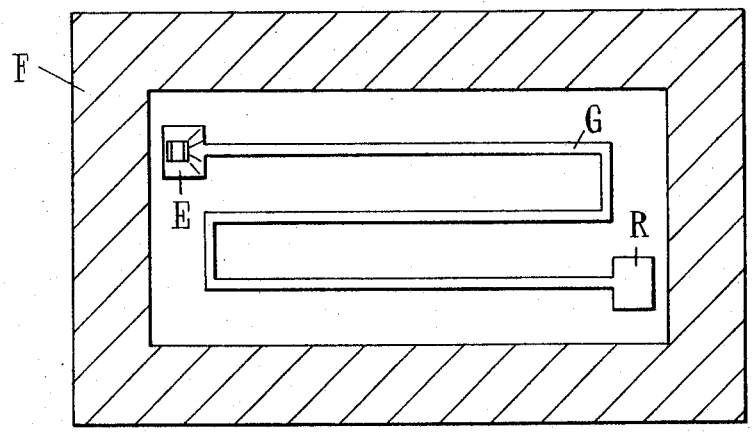
Figure 2:
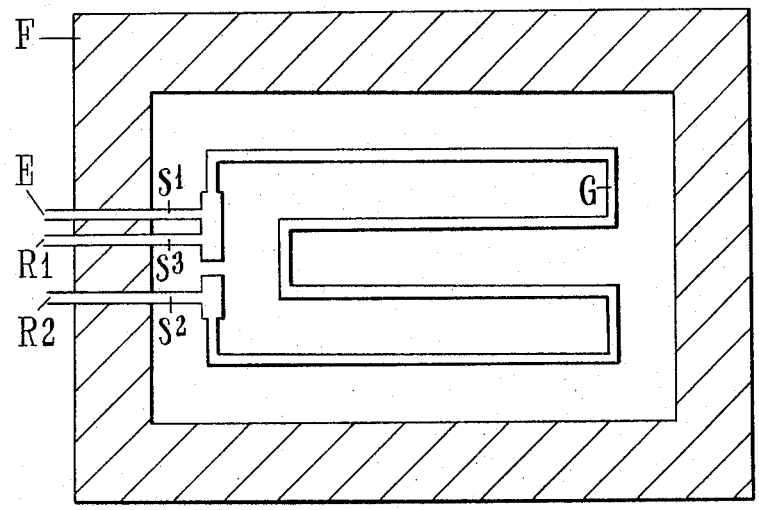

Though the guide can be solid (and in this case it is best to use waves of ultrasonic frequency), it is preferred to use a hollow elongated duct as a guide. The invention will be further described with reference to the accompanying drawings in which FIGURES 1 and 2 show two different embodiments of apparatus for carrying out the method of the invention. In FIGURE 1 F indicates a furnace wall (i.e. an enclosure), E a sound generator or emitter, G the guide, and R the sound receiver. The guide should be filled with a gas which is a good conductor of sound and has a high thermal conductivity. When sound waves of audio frequency are employed the gas can be caused to flow from one end of the guide to the other. The walls of the hollow guide should themselves be made of a material with a high thermal conductivity.

In order to increase the volume of material whose temperature is to be measured contacting the guide, the guide should preferably not be straight and can be in the form of a loop in the form of a helix or in another sinuous shape. It is found that by using such a guide the accuracy of measurement is increased.

When the apparatus for receiving and emitting the sound waves is placed outside the enclosure (see FIGURE 2 of the accompanying drawing) it is desirable to allow for the fact that the temperature in the parts S1 and S2 for connecting the sound emitter E and sound receiver R2 with the guide G, is different to that of the guide. Therefore, a further connecting piece S3 is connected with the same end of the guide G as the collecting piece S1 and a further sound receiver R1 is connected to this connecting piece S3. All the connecting pieces are placed close together in the wall of the furnace or enclosure F so that they are the same temperature. By measuring the time taken for the sound waves to pass from the emitter E to the receiver R1 and subtracting these values from all measurements of the time taken for the sound waves to pass from the emitter to the receiver R2 the readings will merely relate to the passage of the sound from one end of the guide G proper to the other end and therefore no errors will be introduced by the connecting pieces S1 and S2.

The sound waves are preferably in the form of short pulses.

Specific embodiments of the invention using hollow copper guides have been used for measuring temperatures up to 250° C. and higher. It should be remembered that the speed of sound waves in a gas will increase as temperature decreases in accordance with a square law. It may therefore be advisable to modify the nature of the gas to measure temperatures in different ranges.

It may also be advisable to provide the apparatus with means for automatically allowing for variations in the length of the guide brought about by thermal expansion.

While I have described concrete embodiments of my invention for the purpose of enabling those skilled in the art to take advantage of the invention it is to be understood that the monopoly sought in the United States is not to be restricted to these concrete embodiments but it is to be determined in accordance with the spirit and gist of the following claim.

I claim:

An apparatus for determining temperature comprising material whose temperature is to be measured and an enclosure containing the material; an elongated guide in contact with the material whose temperature is to be measured; three connecting pieces of which two are connected with one end of the guide and pass through the enclosure so as to form a U-shape while the other connecting piece is connected with the other end of the guide and passes through the enclosure; and an emitter connected with the outer end of one of the connecting pieces forming of the U-shape; and two sound receivers connected with the two outer ends of the other two connecting pieces.

References Cited by the Examiner

UNITED STATES PATENTS

| | | | |
|---|---|---|---|
| 2,582,232 | 1/1952 | Cesaro et al. | 73—339 |
| 3,137,169 | 6/1964 | Clement et al. | 73—339 |
| 3,214,976 | 11/1965 | Miller | 73—339 |
| 3,214,977 | 11/1965 | Apfel | 73—339 |

FOREIGN PATENTS 156,322   1963   Russia.

LOUIS R. PRINCE, *Primary Examiner.*

D. McGIEHAN, N. B. SIEGEL, *Assistant Examiners.*